(12) United States Patent
Melanson et al.

(10) Patent No.: US 8,847,719 B2
(45) Date of Patent: Sep. 30, 2014

(54) TRANSFORMER WITH SPLIT PRIMARY WINDING

(75) Inventors: John L. Melanson, Austin, TX (US); Mauro L. Gaetano, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1107 days.

(21) Appl. No.: 12/241,973

(22) Filed: Sep. 30, 2008

(65) Prior Publication Data

US 2010/0019874 A1 Jan. 28, 2010

Related U.S. Application Data

(60) Provisional application No. 61/083,717, filed on Jul. 25, 2008.

(51) Int. Cl.
| | |
|---|---|
| H01F 17/06 | (2006.01) |
| H01F 21/02 | (2006.01) |
| H01F 27/28 | (2006.01) |
| H01F 27/30 | (2006.01) |
| H01F 27/24 | (2006.01) |
| H01F 3/10 | (2006.01) |
| H01F 3/14 | (2006.01) |
| H01F 38/02 | (2006.01) |
| H01F 38/08 | (2006.01) |

(52) U.S. Cl.
CPC *H01F 38/02* (2013.01); *H01F 3/14* (2013.01); *H01F 2038/026* (2013.01); *H01F 3/10* (2013.01); *H01F 38/08* (2013.01)
USPC ........... 336/178; 336/145; 336/180; 336/184; 336/198; 336/212; 336/214; 336/215

(58) Field of Classification Search
USPC ......... 336/145, 178, 180–182, 184, 198, 212, 336/214, 215
See application file for complete search history.

(56) References Cited

U.S. PATENT DOCUMENTS

| 2,439,107 A | * | 4/1948 | Slater ...................... 307/132 R |
| 2,875,378 A | * | 2/1959 | Walsh .......................... 315/100 |
| 4,992,919 A | | 2/1991 | Lee et al. |
| 4,994,952 A | | 2/1991 | Silva et al. |
| 5,053,738 A | * | 10/1991 | Sato et al. ..................... 336/165 |
| 5,122,947 A | * | 6/1992 | Hishiki .......................... 363/61 |

(Continued)

FOREIGN PATENT DOCUMENTS

| DE | 102004029434 A1 * | 1/2006 |
| GB | 2 262 673 A | 6/1993 |

(Continued)

OTHER PUBLICATIONS

Mammano, Bob; Resonant Mode Converter Topologies; Texas Instruments, 2001.

(Continued)

*Primary Examiner* — Tsz Chan
(74) *Attorney, Agent, or Firm* — Russell Ng PLLC (57) ABSTRACT

A transformer includes a core having a first leg, a second leg and a third leg, a split primary winding including first turns about the first leg electrically coupled with second turns about the third leg, and a secondary winding about the second leg. Magnetic flux linking the first turns of the split primary winding and magnetic flux linking the second turns of the primary winding link the secondary winding.

23 Claims, 5 Drawing Sheets

(56) References Cited

U.S. PATENT DOCUMENTS

| | | | |
|---|---|---|---|
| 5,359,180 A | | 10/1994 | Park et al. |
| 5,481,178 A | | 1/1996 | Wilcox et al. |
| 5,994,885 A | | 11/1999 | Wilcox et al. |
| 6,069,798 A | * | 5/2000 | Liu .................................. 363/16 |
| 6,081,438 A | * | 6/2000 | Saint-Pierre et al. ........... 363/95 |
| 6,304,066 B1 | | 10/2001 | Wilcox et al. |
| 6,549,436 B1 | * | 4/2003 | Sun .................................. 363/44 |
| 6,580,258 B2 | | 6/2003 | Wilcox et al. |
| 7,199,569 B1 | * | 4/2007 | Nakahori ....................... 323/355 |
| 7,332,992 B2 | * | 2/2008 | Iwai ............................... 336/170 |

FOREIGN PATENT DOCUMENTS

| | | | |
|---|---|---|---|
| JP | 2007-73592 A | | 3/2007 |
| JP | 2007073592 A | * | 3/2007 |
| RU | 2199786 C2 | * | 2/2003 |
| WO | 97/42714 | | 11/1997 |

OTHER PUBLICATIONS

Lin et al., "Robust Controller Design for a Series Resonant Converter via Duty-Cycle Control", IEEE Transactions on Power Electronics, Sep. 1999, p. 793-802, vol. 14 No. 5.

Hattrup et al., "Fast Estimation Techniques for Digital Control of Resonant Converters", IEEE Transactions on Power Electronics, Jan. 2003, p. 365-372, vol. 18 No. 1.

Foster et al., "Cyclic-Averaging for High Speed Analysis of Resonant Converters", IEEE Transactions on Power Electronics, Jul. 2003, p. 985-993, vol. 18, No. 4.

Mangat et al., "A Modified Asymmetrical Pulse-Width-Modulated Resonant DC/DC Converter Topology", IEEE Transactions on Power Electronics, Jan. 2004, p. 104-111, vol. 19, No. 1.

Tuomainen et al., "Effect of Resonant Transition on Efficiency of Forward Converter with Active Clamp and Self-Driven SRs", IEEE Transactions on Power Electronics, Mar. 2005, p. 315-323, vol. 20, No. 2.

Lilei Gu et al., "Three-Level LLC Series Resonant DC/DC Converter", IEEE Transactions on Power Electronics, Jul. 2005, p. 781-789, vol. 20, No. 4.

Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.

Chen et al., "Generalized Optimal Trajectory Control for Closed Loop Control of Series-Parallel Resonant Converter", IEEE Transactions on Power Electronics, Sep. 2006, p. 1347-1355, vol. 21, No. 5.

Xie et al., "Analysis and Optimization of LLC Resonant Converter With a Novel Over-Current Protection Circuit", IEEE Transactions on Power Electronics, Mar. 2007, p. 435-443, vol. 22 No. 2.

Bhat et al., "Analysis and Design of a High-Frequency Resonant Converter Using •LCC-Type Commutation", IEEE Transactions on Power Electronics, Oct. 1987, p. 291-301, vol. PE-2 No. 4.

De Groot et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.

Abramovitz et al., "A Resonant DC-DC Transformer With Zero Current Ripple", IEEE Transactions on Power Electronics, Nov. 2007, p. 2344-2351, vol. 22, No. 6.

Ye et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.

Yan Lu et al., "Quasi Current Mode Control for the Phase-Shifting Series Resonant Converter", IEEE Transactions on Power Electronics, Jan. 2008, p. 353-358, vol. 23 No. 1.

Texas Instruments BiCMOS Advanced Phase-Shift PWM Controller Datasheet, Dec. 1999, Rev. Apr. 2008.

Vishwanathan, et al., "High Voltage DC Power Supply Topology for Pulsed Load Applications with Converter Switching Synchronized to Load Pulses", vol. 1, Nov. 2003.

Intersil, AN1262.0, "Designing with the ISL6752, ISL6753 ZVS Full-Bridge Controllers", Aug. 2006.

Serial No. 200910161002.8, Chinese Office Action dated Oct. 31, 2011.

* cited by examiner

TRANSFORMER WITH SPLIT PRIMARY WINDING

PRIORITY CLAIM AND CROSS-REFERENCE

The present application claims priority to U.S. Provisional Patent Application 61/083,717, filed Jul. 25, 2008, which is incorporated herein by reference in its entirety.

BACKGROUND OF THE INVENTION

1. Technical Field

The present invention relates in general to electrical circuits, and in particular, to transformers and related powered systems.

2. Description of the Related Art

Power conditioning circuits have evolved over the years from linear regulators to low frequency pulse-width modulated systems and then to high frequency square wave converters. More recently, resonant converters have been adopted in order to achieve improved performance in a more compact, lightweight and inexpensive package.

A resonant converter is a power conditioning system that employs a resonant L-C circuit in performing power conversion. In general, a resonant converter controls the operation of one or more switches to apply a square wave of voltage (or current) to the resonant circuit. Energy within the resonant circuit is then transferred to a load coupled to the converter output.

As will be appreciated by those skilled in the art, numerous topologies of resonant converters are possible, including boost mode, buck mode and buck-boost (flyback) and boost-buck. Many common resonant converter topologies employ one or more transformers to achieve design objectives, such as impedance matching, isolation between the input and output, reduction of electromagnetic interference (EMI), etc. The present disclosure describes a transformer design that may be employed, without limitation, as a transformer in a resonant converter.

SUMMARY OF THE INVENTION

In at least one embodiment, a transformer includes a core having a first leg, a second leg and a third leg, a split primary winding including first turns about the first leg electrically coupled with second turns about the third leg, and a secondary winding about the second leg. Magnetic flux linking the first turns of the split primary winding and magnetic flux linking the second turns of the primary winding link the secondary winding.

BRIEF DESCRIPTION OF THE DRAWINGS

The present invention, as well as a preferred mode of use, will best be understood by reference to the following detailed description of one or more illustrative embodiments when read in conjunction with the accompanying drawings, wherein.

DETAILED DESCRIPTION OF ILLUSTRATIVE EMBODIMENT

Figure 1:
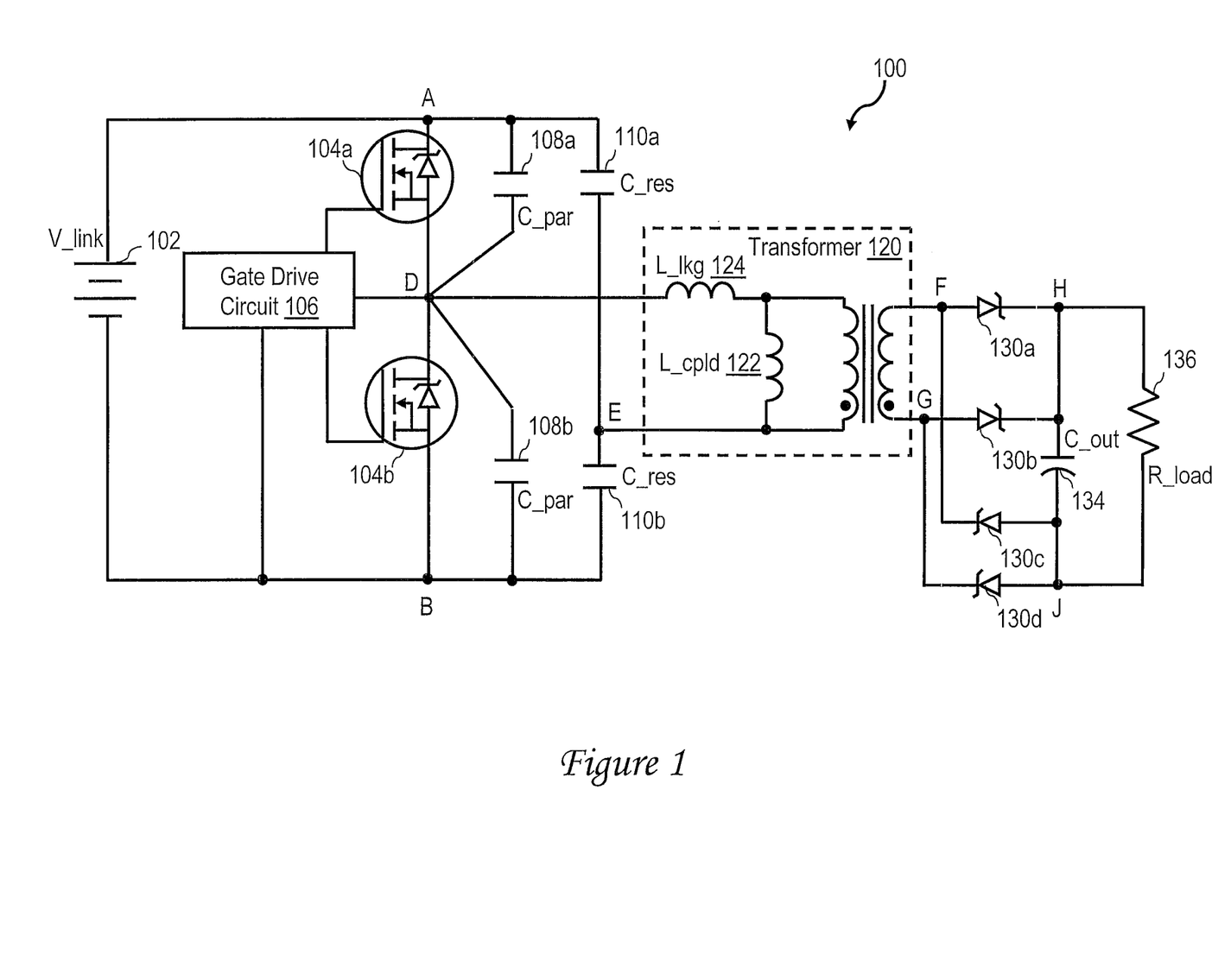
FIG. 1 is high level schematic diagram of a resonant converter in accordance with one embodiment.

With reference now to the figures and in particular with reference to FIG. 1, there is illustrated a high level schematic diagram of an exemplary resonant converter 100 including a transformer 120 in accordance with one embodiment. As shown, on the primary side of transformer 120, resonant converter 100 includes a DC voltage source V_link 102, which can be provided by any suitable voltage source. In many common applications, such as home appliances, computers and other consumer electronics, and fluorescent light ballasts, V_link 102 may have a voltage of between approximately 150 VDC and 400 VDC, and may be implemented, for example, by a rectifier of AC line (mains) power. In such applications, the power provided by V_link 102 may optionally further have power factor correction applied. For ease of reference, the positive terminal of V_link 102 is referred to herein as node A, and the negative terminal of V_link 102 is referred to as node B.

A pair of switching devices, such as field effect transistors (FETs) 104a, 104b, are coupled in a half bridge across V_link 102 in order to provide a desired voltage waveform, such as a square wave. Switching of FETs 104a and 104b and thus the voltage waveform (and the associated current waveform) are controlled by gate drive circuit 106. In many applications, gate drive circuit 106 operates FETs 104a and 104b in complementary manner, meaning that while FET 104a is on, FET 104b is off and vice versa.

Coupled in parallel with each of FETs 104a, 104b is a respective parasitic capacitor C_par 108a or C_par 108b shunting a corresponding one of the switching devices. Thus, C_par 108a is coupled between node A and an intermediate node D between FETs 104a and 104b, and C_par 108b is coupled between node D and node B.

A pair of resonant capacitors C_res 110a and C_res 110b is further coupled across V_link 102 between nodes A and B. The values of C_res 110a and C_res 110b are selected to determine the desired resonant frequency of resonant converter 100. C_res 110a and C_res 110b are coupled together at node E.

As is known in the art, transformer 120 includes a primary winding and a secondary winding whose turn ratio is one factor governing the voltage induced across the secondary winding. In the equivalent circuit shown in FIG. 1, transformer 120 is characterized by a coupled inductance L_cpld 122, as well as a leakage inductance L_lkg 124, which together with C_res 110a and C_res 110b, forms the resonant circuit of resonant converter 100. As described further below with respect to FIGS. 2A-2B, coupled inductance L_cpld 124 and leakage inductance L_lkg 122 are preferably not implemented as separate inductor components, but are instead simply characteristics of transformer 120 determined by its construction. In such embodiments, the primary winding of transformer 120 is coupled between nodes D and E.

The secondary winding of transformer 120, which has terminals defined by nodes F and G, is coupled to a filtered full wave rectifier. The filtered full wave rectifier includes four diodes 130a, 130b, 130c and 130d, where diode 130a has an input coupled to node F and an output coupled to a first output node H, diode 130b has an input coupled to node G and an output coupled to first output node C, diode 130c has an input coupled to a second output node J and an output coupled to node F, and diode 130d has an input coupled to second output node J and an output coupled to node G. The filtered full wave rectifier further includes an output capacitor C_out 134 coupled across output nodes H and J to filter or smooth the ripple in the pulsating DC power (e.g., 20 VDC) created by the full wave rectifier. The magnitude of the ripple depends, for example, on the input voltage magnitude and frequency, the filter capacitance, and the load resistance R_load 136 coupled across output nodes H and J.

Figure 2A:
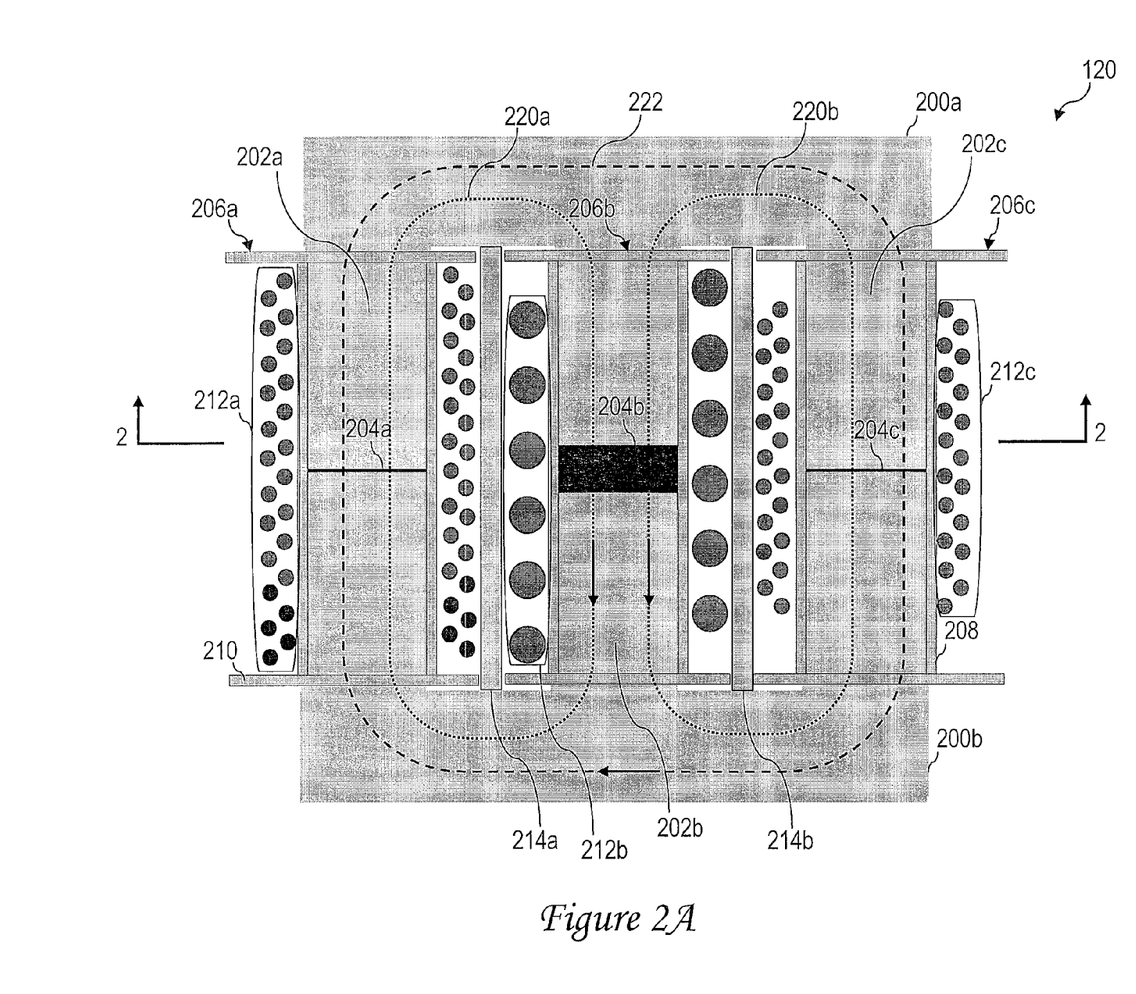
FIG. 2A is a first section view of an exemplary embodiment of a transformer that may be employed, for example, in a converter, such as the resonant converter depicted in FIG. 1.
Figure 2B:
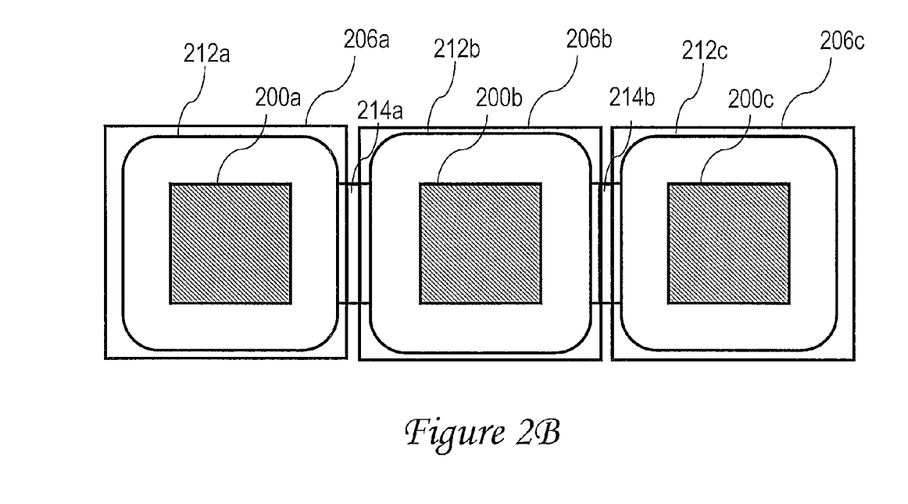
FIG. 2B is a second section view of the exemplary embodiment of a transformer along the line 2-2 depicted in FIG. 2A.

Referring now to FIG. 2A, there is depicted a section view of an exemplary embodiment of a transformer 120 that may be employed, for example, within a converter, such as resonant converter 100 of FIG. 1. In the exemplary embodiment, transformer 120 has a high permeability core (e.g., a ferrite core) having at least outer first and third legs 202a and 202c and an inner second leg 202b disposed between first and third legs 202a and 202c. The core may be, for example, a commercially available EE core formed of a first E core section 200a and a second E core section 200b. Alternatively, the core may be a commercially available EI core formed of an E core section and an I core section (not shown). As shown in FIG. 2B, which is a section view along line 2-2 of FIG. 2A, first E core section 200a (and second E core section 200b) and each leg 202 thereof commonly have (but are not required to have) a square or rectangular cross-section.

As further shown in FIG. 2A, when the core of transformer 120 is assembled, second leg 202b has an air gap 204b formed therein between the core sections, which as discussed below defines the so-called leakage inductance of transformer 120. Additionally, first and third legs 202a and 202c may optionally have respective air gaps 204a and 204c formed therein between the core sections. In embodiments in which first and second legs 202a and 202c include air gaps 204a and 204c, air gaps 204a and 204c are typically smaller than air gap 204b in second leg 202b.

Each of first, second and third legs 202a, 202b and 202c carries a respective one of bobbins 206a, 206b and 206c. Bobbins 206a, 206b and 206c may be formed, for example, of a thermoplastic (e.g., Polybutylene Terephthalate (PBT)) or thermoset plastic (e.g., a phenolic). Each bobbin 206a, 206b, or 206c has a core housing portion 208 for carrying an electrically conductive wire coil forming a primary or secondary winding and a core spacing portion 210 that maintains physical separation of the wire coil from the core and physical separation of the wire coil and the core from an external transformer housing, if any.

In the illustrated embodiment, second bobbin 206b carries the secondary winding 212b, which is preferably but not necessarily wound on second bobbin 206b in a single layer. In many common applications in which transformer 120 is a step-down transformer in which secondary winding 212b has a lower voltage and higher current than the primary winding, secondary winding 212b is formed of larger wire than the primary winding. It is further preferable if secondary winding 212b is formed of multi-strand Litz wire in order to minimize skin effect losses and proximity effect losses.

Figure 2C:
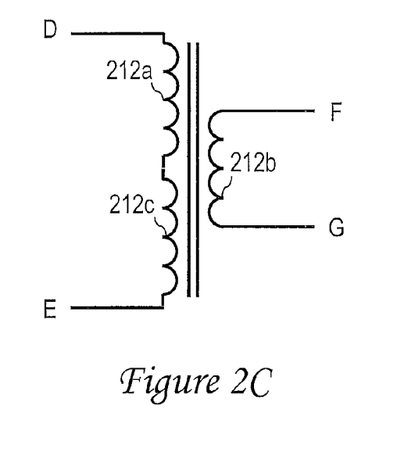
FIG. 2C is a schematic diagram depicting the turns of a split primary winding connected in series.
Figure 2D:
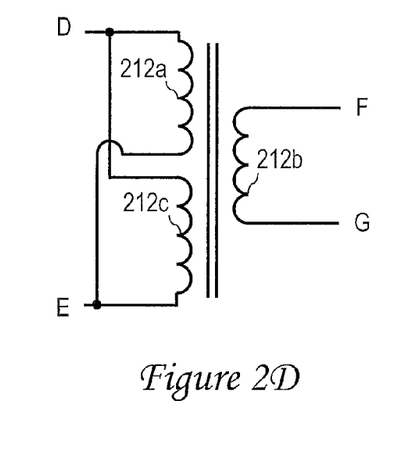
FIG. 2D is a schematic diagram depicting the turns of a split primary winding connected in parallel.

In the depicted embodiment, first bobbin 206a and third bobbin 206c carry respective portions 212a and 212c of a split primary winding, which are electrically connected, either in series as shown in FIG. 2C or in parallel as shown in FIG. 2D. As noted above, the primary winding usually has a higher number of turns and a lower current than the secondary winding, permitting use of a smaller diameter wire in the primary winding than in the secondary winding. The wire diameter requirement can be further reduced by the connection of the two primary winding portions 212a and 212c in parallel as shown in FIG. 2D, meaning that each of portions 212a and 212c carries only a portion of the total primary winding current. The primary winding may benefit from the use of Litz wire, but there is no requirement that the wire be stranded in view of the higher number of turns and (if applicable) its parallel construction.

In contrast to the construction of conventional split primary windings, portions 212a and 212c of the primary winding have unequal numbers of turns. In many implementations, the numbers of turns are fairly close and differ by, for example, between approximately 1 and 20 percent, and more particularly, about 10 percent. FIG. 2A illustrates portion 212a having a larger number of turns than portion 212c; however, it should be appreciated that it is immaterial which of portions 212a and 212c has a higher turn count.

The choice between series and parallel construction for the split primary winding is application-dependent. In a parallel construction, portions 212a and 212c of the split primary winding have the same voltage across them, but produce different fluxes. In this case, portion 212c, which has fewer turns, produces more flux and carries more current than portion 212a; however, as the current through portions 212a and 212c is summed, the current through each portion of the split primary winding is less than if a series construction is utilized and thus a smaller gauge wire can be employed. In a series construction, portions 212a and 212c of the split primary winding carry the same current, but have different voltages across them. In this case, portion 212a, which has more turns, produces more flux and sustains a larger voltage than portion 212c. Thus, an implementation with higher current (and hence a need for larger diameter wire) and lower voltage would favor a parallel connection, and an implementation with lower current and higher voltage (and hence a need for thicker insulation) would favor a series connection. It should also be noted that specific dimensional constraints and construction considerations, such as wire type, ease of termination and soldering, and bobbin shape and material, can all contribute to a selection of one construction over the other.

As installed on the core, the primary and secondary windings are physically separated, facilitating the placement of insulation barriers 214a and 214b between first and second legs 202a and 202b and between second and third legs 202b and 202c, respectively. The physical separation of the primary and secondary windings also reduces the capacitance between the primary and secondary windings, desirably reducing the coupling of electromagnetic interference (EMI) across transformer 120.

When energized by the application of current to the split primary winding, the magnitudes of the resulting magnetic fluxes 220a and 220b respectively linking portions 212a and 212c of the primary winding are inversely proportional to the number of winding turns. Thus, magnetic flux 220b of portion 212c is larger than magnetic flux 220a of portion 212a. As indicated, portions 212a and 212c of the primary winding are phased so that magnetic fluxes 220a and 220b add into second leg 202b, linking with secondary winding 212b. The additional magnetic flux 222 generated by the lower turn secondary winding 212b circulates in the outer ring of the core in opposition to magnetic flux 220b of portion 212c in order to offset the shortage of magnetic flux supplied by portion 212a of the primary winding. This differential magnetic flux 222 does not flow through second leg 202b and is not linked with secondary winding 212b, giving rise to a well-controlled leakage inductance 124.

As utilized herein, the term "leakage inductance" is employed to conform to industry tradition. However, it should be noted that in the depicted embodiment the major fraction of this uncoupled "leakage" inductance is not magnetic flux leaking outside the transformer core into the surrounding space, but rather is flux rerouted from secondary winding 212b as the result of a deliberate design choice in order to reduce the magnetic coupling between the primary and secondary windings. The magnitude of leakage inductance 124 depends only on the core geometry, the difference in turns between the two portions 212a, 212c of the split primary winding, and the (usually small) air gap(s) 204a, 204c in first and third legs 202a and 202c, but does not depend appreciably on the winding relative position and shape, as is usually the case for a true leakage inductance. Consequently, the magnitude of leakage inductance 124 and thus the current in secondary winding 212b can be easily controlled during the manufacturing process.

The coupled (or magnetizing) inductance 122 is determined primarily by the gap in the center leg, which is usually held to tight tolerances during the manufacture of transformer 120.

Figure 3:
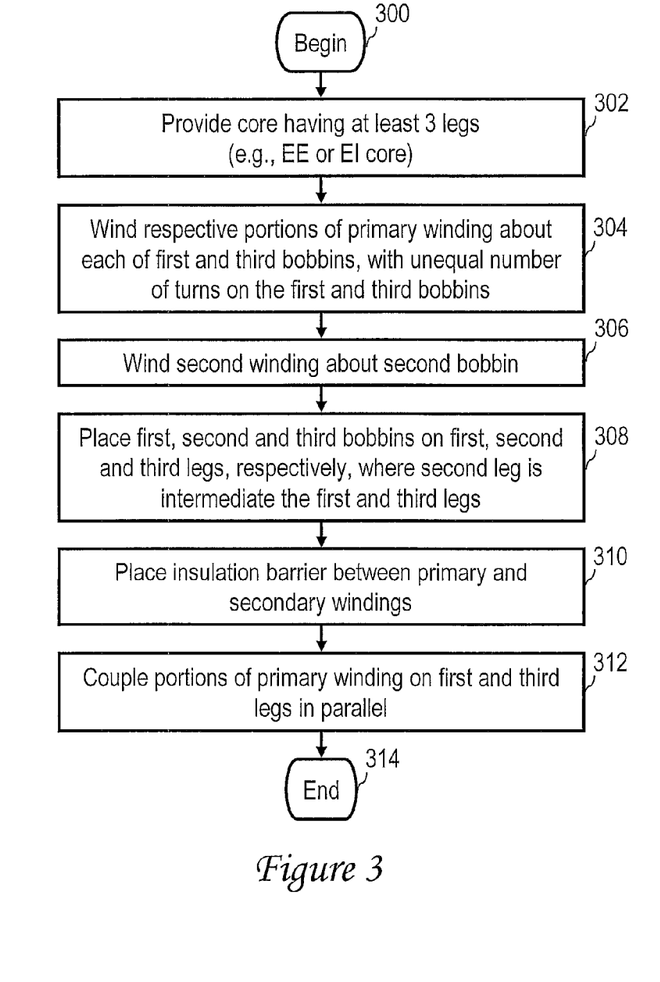
FIG. 3 is a high level logical flowchart of an exemplary process of making a transformer in accordance with one embodiment.

Referring now to FIG. 3, there is illustrated a high level logical flowchart of an exemplary process of making a transformer 120 in accordance with one embodiment. As a logical flowchart, at least some of the illustrated steps may be performed concurrently or in an order other than that shown.

The process begins at block 300 and then proceeds to block 302, which depicts providing a core having at least three legs. As noted above, the core may be, for example, an EE or EI ferrite core. At block 304, portions 212a and 212c of the primary winding are wound about first and third bobbins 206a and 206c, respectively. The numbers of turns in portions 212a and 212c is unequal, and is selected to determine the desired value of the leakage inductance L_lkg 124 of transformer 120. In addition, at block 306 secondary winding 212b is wound about second bobbin 206b. The primary and secondary windings may then optionally be subjected to a varnish impregnation treatment in order to fix the windings in place relative to bobbins 206a, 206b and 206c.

As indicated at block 308, first, second and third bobbins 206a, 206b and 206c are placed on first, second and third legs 202a, 202b and 202c, respectively. Bobbins 206a, 206b and 206c are installed in relative orientation to ensure that magnetic fluxes 220a and 220b are additive in second leg 202b as shown in FIG. 2A. The primary and secondary windings are electrically insulated from one another by the installation of interstitial insulation barriers 214a and 214b, as depicted at block 310. In addition, portions 212a and 212c of the primary winding are electrically coupled in parallel, as illustrated at block 312. Transformer 120 may optionally be packaged in an external housing. The process shown in FIG. 3 thereafter terminates at block 314.

Figure 4A:
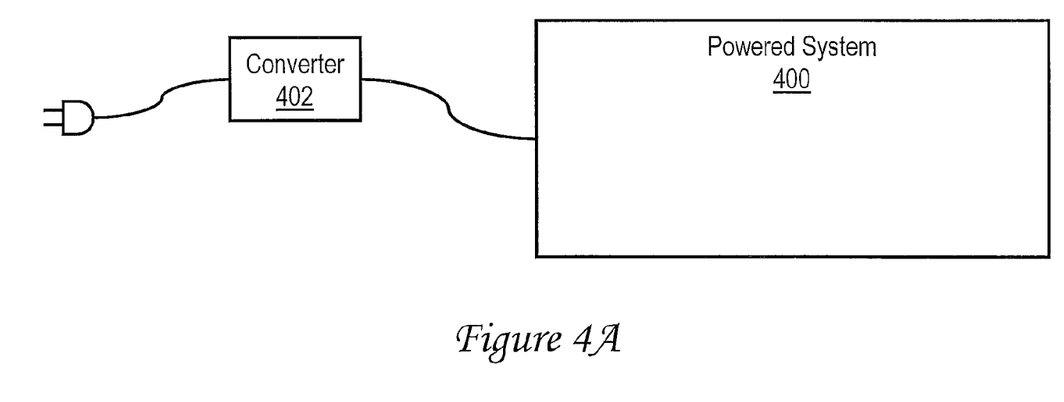
FIG. 4A is a high level schematic diagram of an external AC-to-DC converter coupled to a powered system in accordance with one embodiment.
Figure 4B:
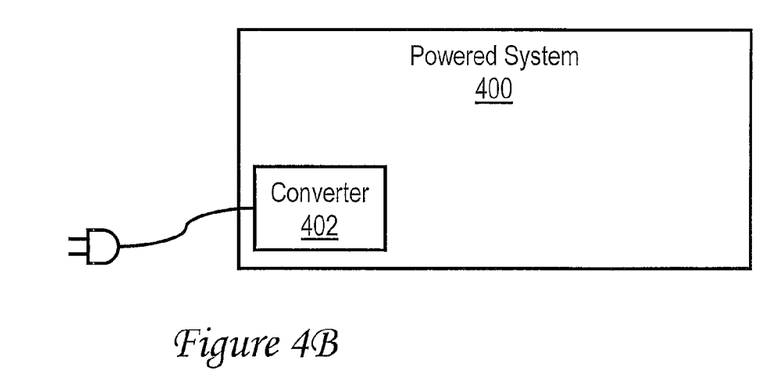
FIG. 4B is a high level schematic diagram of an internal AC-to-DC converter coupled to a powered system in accordance with one embodiment.

With reference now to FIGS. 4A-4B, there are illustrated high level schematic diagrams of alternative embodiments of a powered system, which may be any type of system that utilizes electrical power. In each of the depicted embodiments, a powered system 400 is electrically connected to and receives power from a converter (or power supply) 402, which in many common implementations is an AC-to-DC converter, such as the resonant converter depicted in FIG. 1 or another type of converter. Converter 402 includes a transformer having a split primary winding as described herein. As indicated in FIG. 4A, converter 402 may be external to powered system 400, as is currently common for portable electronic devices, such as laptop computers, mobile telephones, portable music players, etc. Alternatively, as depicted in FIG. 4B, converter 402 may be implemented internal to a housing of the powered system 400, for example, as is currently common for desktop personal computer systems.

A transformer design has been described, which is suitable for use, for example, in a converter. The transformer design provides, inter alia:
1. isolation between the primary and secondary windings that satisfies various safety standards;
2. a precise voltage ratio, which is not necessarily related to the primary-to-secondary turn ratio given the low coupling coefficient;
3. a high leakage inductance of controlled value;
4. a compact design that can be sized to conform to dimensional constraints.

While one or more preferred embodiments have been described, it will be understood by those skilled in the art that various changes in form and detail may be made therein without departing from the spirit and scope of the claims set forth below.

What is claimed is:

1. A transformer, comprising:
a core having a first leg, a second leg and a third leg, wherein at least the second leg has an air gap therein;
a split primary winding including first turns about the first leg electrically coupled with second turns about the third leg; and
a secondary winding about the second leg, wherein magnetic flux linking the first turns of the split primary winding and magnetic flux linking the second turns of the split primary winding are additive in the second leg and link the secondary winding.

2. The transformer of claim 1, wherein the first turns and the second turns of the split primary winding are electrically connected in parallel.

3. The transformer of claim 1, wherein the first turns and the second turns of the split primary winding are electrically connected in series.

4. The transformer of claim 1, wherein a first number of the first turns is different than a second number of the second turns.

5. The transformer of claim 4, wherein a third number of turns of the secondary winding is less than the first and second numbers of turns.

6. The transformer of claim 1, wherein:
the air gap is a first air gap; and
at least one of a set including the first and second legs has a second air gap therein.

7. The transformer of claim 6, wherein the first air gap is larger than the second air gap.

8. The transformer of claim 1, and further comprising insulation disposed between the first turns and the secondary winding and disposed between the second turns and the secondary winding.

9. The transformer of claim 1, and further comprising first, second and third bobbins disposed on the first, second and third legs, respectively, wherein:
the first turns are wound about the first bobbin;
the second turns are wound about the third bobbin; and
the secondary winding is wound about the second bobbin.

10. The transformer of claim 1, wherein the second leg is a center leg disposed between the first and third legs.

11. The transformer of claim 1, wherein the core comprises an EE core.

12. A converter including a transformer in accordance with claim 1.

13. The transformer of claim 1, wherein:
the second leg is a center leg disposed between the first and third legs;
a first number of the first turns is different than a second number of the second turns; and
a third number of turns of the secondary winding is less than the first and second numbers of turns.

14. The transformer of claim 13, wherein:
the air gap is a first air gap; and
at least one of a set including the first and second legs has a second air gap therein.

15. A system, comprising:
a power supply including a transformer having:
   a core having a first leg, a second leg and a third leg, wherein at least the second leg has an air gap therein;
   a split primary winding including first turns about the first leg electrically coupled with second turns about the third leg; and
   a secondary winding about the second leg, wherein magnetic flux linking the first turns of the split primary winding and magnetic flux linking the second turns of the split primary winding are additive in the second leg and link the secondary winding; and
a powered system electrically coupled to receive power from the power supply.

16. The system of claim 15, wherein:
the powered system includes a housing;
the power supply is internal to the housing.

17. The system of claim 15, wherein:
the powered system includes a housing;
the power supply is external to the housing.

18. The system of claim 15, wherein the first turns and the second turns of the split primary winding are electrically connected in parallel.

19. The system of claim 15, wherein the first turns and the second turns of the split primary winding are electrically connected in series.

20. The system of claim 15, wherein a first number of the first turns is different than a second number of the second turns.

21. The system of claim 20, wherein a third number of turns of the second secondary winding is less than the first and second numbers of turns.

22. The system of claim 15, wherein the second leg is a center leg disposed between the first and third legs.

23. The system of claim 15, wherein:
the second leg is a center leg disposed between the first and third legs;
a first number of the first turns is different than a second number of the second turns; and
a third number of turns of the secondary winding is less than the first and second numbers of turns.

\* \* \* \* \*